United States Patent [19]

Sekmakas et al.

[11] 4,145,323

[45] Mar. 20, 1979

[54] AQUEOUS COATINGS BASED ON EPOXY ESTER COPOLYMERS

[75] Inventors: Kazys Sekmakas, Chicago; Raj Shah, Schaumburg, both of Ill.

[73] Assignee: DeSoto, Inc., Des Plaines, Ill.

[21] Appl. No.: 804,002

[22] Filed: Jun. 6, 1977

[51] Int. Cl.$^2$ .............................................. C08L 61/10
[52] U.S. Cl. ..................... 260/29.3; 220/470; 260/19 R; 260/21; 260/23 EP; 260/29.4 UA; 260/29.6 R; 260/33.4 R; 260/836; 260/837 R; 260/875; 526/317; 526/347
[58] Field of Search .......... 260/19 EP, 23 EP, 18 EP, 260/29.3, 29.4 UA, 29.6 NR, 29.6 R, 29.6 RW, 336, 837 R, 875; 526/273, 317; 220/64

[56] References Cited

U.S. PATENT DOCUMENTS

| | | | |
|---|---|---|---|
| 2,596,737 | 5/1952 | Tess et al. | 260/23 |
| 2,877,195 | 3/1959 | McNabb | 260/23 |
| 3,293,201 | 12/1966 | Shahade et al. | 260/23 |
| 3,563,929 | 2/1971 | Guldenpfennig | 260/23 |
| 3,567,668 | 3/1971 | Guldenpfennig | 260/19 |
| 3,663,487 | 5/1972 | Broecker | 260/23 EP |

*Primary Examiner*—Theodore E. Pertilla
*Attorney, Agent, or Firm*—Dressler, Goldsmith, Clement, Gordon & Shore, Ltd.

[57] ABSTRACT

Aqueous coatings particularly adapted for interior sanitary can use are provided in which the resin solids are constituted by a solution copolymer of a resinous polyepoxide esterified to be epoxy-free with from about 0.3 to about 1.5 moles of at least one monocarboxylic acid containing conjugated ethylenic unsaturation per mol of polyepoxide. This esterified polyepoxide is Diels Alder adducted with from 3% to 10%, based on the weight of the copolymer, of an ethylenically unsaturated dicarboxylic acid, and this adduct is copolymerized with from 10% to 50%, based on the weight of the copolymer, of monoethylenically unsaturated nonreactive monomer containing a terminal ethylenic group, such as styrene or vinyl toluene. This copolymer can be dispersed in water with the aid of a volatile base and aminoplast or phenoplast resin can be incorporated.

15 Claims, No Drawings

AQUEOUS COATINGS BASED ON EPOXY ESTER COPOLYMERS

The present invention relates to aqueous coating compositions which are particularly adapted for application to the interior of sanitary cans.

The objective is to provide an aqueous coating system which contains a copolymer which includes a minimal proportion of reactive monomer and which cures at minimum baking temperature. In some aspects of this invention, the coatings will cure in air at room temperature.

This application is related to our prior applications Ser. Nos. 715,382 filed Aug. 18, 1976 now abandoned and 749,968 filed Dec. 13, 1976 now abandoned.

In accordance with this invention, a resinous polyepoxide, and preferably a bisphenol-based polyepoxide having a 1,2-epoxy equivalency of from about 1.4 to about 2.0, is reacted (esterified) with at least one ethylenically unsaturated monocarboxylic acid to substantially consume the epoxy functionality and at least a portion of the monocarboxylic acids contains conjugated ethylenic unsaturation. In preferred practice, a second monocarboxylic acid containing nonterminal nonconjugated ethylenic unsaturation is used, but this is not essential. The resulting unsaturated epoxy ester thus contains conjugated unsaturated side chains, and this enables a small proportion of a monoethylenically unsaturated dicarboxylic acid containing nonterminal unsaturation to be incorporated by a Diels Alder reaction while leaving some of the conjugated unsaturation unconsumed. The epoxy ester adduct is then copolymerized in organic solvent solution, the solvent being preferably water miscible, with monethylenically unsaturated monomer containing terminal ethylenic unsaturation, especially with styrene, vinyl toluene or a mixture thereof. This forms a normally solid nongelled organic solvent soluble copolymer with the conjugated unsaturation in the epoxy ester while leaving the nonterminal nonconjugated unsaturation supplied by the dicarboxylic acid reaction product or by the second monocarboxylic acid unconsumed in a copolymer containing carboxyl groups which permits dispersion in water by at least partial neutralization with a volatile base to form an aqueous coating solution in which aminoplast or phenoplast resin can be dispersed to provide a coating composition which thermosets at very low temperature. If desired, the aminoplast or phenoplast resin can be omitted and a room temperature oxidative cure will thermoset the coating.

The retained unsaturation has the capacity to combine with atmospheric oxygen so that a deposited coating cures both by reaction of methylol groups in the epoxy ester portion of the copolymer as well as by an oxidative cure which is speeded by the moderate heat used. A hydroxy monomer can be added, but this increases the proportion of reactive monomer and is not needed herein.

These low temperature curing aqueous coatings are remarkable because the aminoplast cure of hydroxy functional resins normally requires a curing temperature of from 325° F. to 400° F. to produce a good corrosion-resistant film. In contrast, this invention consistently lowers the temperature which is needed, by at least about 25° F., and the proportion of reactive monomer in the copolymer can be kept below 10%, and is preferably below 6%, based on the weight of the copolymer.

The preferred starting materials are diepoxides or include diepoxides in admixture with monoepoxides. The epoxy esters of this invention are preferably derivatives of the diepoxide component, and have the following formula:

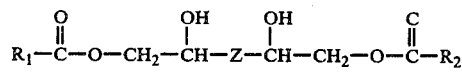

where $R_1$ is the residue of a fatty acid containing conjugated unsaturation, $R_2$ is the residue of a fatty acid containing nonterminal nonconjugated unsaturation, and Z is the residue of an organic diepoxide. The fatty acid would normally contain from 8-22 carbon atoms, preferably from 10-18 carbon atoms in the molecule.

The dicarboxylic acids used herein are preferably selected from fumaric acid, or maleic acid, but similar acids, such as itaconic acid, citraconic acid or aconitic acid can be used. The purpose is to provide a Diels Alder adduct with the dicarboxylic acid without causing polymerization and while using so little acid as to leave residual conjugated unsaturation for copolymerization. The dicarboxylic acid is used in an amount of from 3-10%, preferably 4-6%, based on the weight of the copolymer. As will be evident, selection of a dicarboxylic acid also minimizes the weight percent of acid needed for dispersibility in water with the aid of a base.

It is interesting to note that the same dicarboxylic acid would be Diels Alder adducted with the same conjugated fatty acid, but this would produce a tricarboxylic acid which could not be reacted with polyepoxide to provide the same result as is obtained in this invention.

When the epoxy ester-Diels-Alder adducts described above are copolymerized in water miscible organic solvent solution with nonreactive monoethylenically unsaturated monomers, and especially with styrene or vinyl toluene, a copolymer is formed in which much of the nonconjugated unsaturation in the epoxy ester adduct is retained in a hydroxy functional copolymer containing sufficient dicarboxylic acid for water dispersibility. These nonreactive monomers are used in an amount of from 5-50%, preferably from 10-30% of the weight of the copolymer. The acidic hydroxyfunctional unsaturated resinous copolymer so-obtained is nongelled and organic solvent soluble, and can be dispersed in water with the aid of a base and water miscible organic solvent.

The oxidative cure with atmospheric oxygen is assisted by the presence of driers, and driers, such as cobalt naphthenate, zirconium naphthenate, calcium naphthenate, or similar drier metal fatty acid salt, may be used and are helpful, but these are not needed. The driers would be used in an amount of about 0.3 to about 2%, based on the weight of the copolymer.

The preferred starting materials are resinous polyepoxides. Bisphenol-based diepoxides are particularly preferred. The average molecular weight of these can range from about 350 to about 4000 and the epoxy functionality is preferably in the range of 1.4-2.0, most preferably 1.8-2.0. Higher functional polyepoxides are also useful, but care must be taken to limit the proportion of conjugated fatty acid per mole of polyepoxide to avoid gelation during copolymerization.

It is particularly preferred to employ a diglycidyl ether of bisphenol A having an average molecular weight of about 800 to about 3000, and a diglycidyl ether of bisphenol A having an epoxide equivalent weight of about 900 and an average molecular weight of about 1800 will be used as illustrative.

As previously indicated, the starting diepoxide is reacted with two different types of fatty acids. First, and to enable copolymerization with the terminal unsaturation in the monoethylenically unsaturated monomer and to enable Diels Alder adduction with the dicarboxylic acid, reliance is had upon a fatty acid including conjugated unsaturation. These fatty acids will be illustrated herein by conjugated 9-11 castor fatty acids which are a commercially available mixture of fatty acids which contain conjugated unsaturation at the 9 and 11 positions. Eleostearic acid, found in tung oil, and licanic acid, found in oiticica oil will further illustrate the conjugated fatty acids which are contemplated.

As will be appreciated, conjugated unsaturation is very reactive, and monoethylenic monomers containing the $CH_2=C<$ group (terminal unsaturation) will copolymerize in organic solvent solution with the conjugated unsaturation while leaving the bulk of any nonterminal nonconjugated unsaturation undisturbed.

It is desired that the copolymerization leave the epoxy ester adduct in nongelled organic solvent-soluble condition, and this means that the number of conjugated groups per molecule must be limited to avoid cross-linking which causes premature gelation. For this reason, the conjugated fatty acid is used in an amount to provide from about 0.3 to about 1.5 moles thereof per mole of polyepoxide, and when the epoxy functionality of the diepoxide is more than about 2, then an upper limit of about 1.3 moles of fatty acid per mole of polyepoxide is helpful to avoid undesired gelation. Preferred proportions are from about 0.5 to about 1.2 mole of conjugated fatty acid per mole of polyepoxide.

Substantially the entire balance of the epoxy functionality is consumed by reaction with another monocarboxylic acid, preferably a nonterminal nonconjugated unsaturated fatty acid. However, one can elect to waste a portion of the epoxy groups by esterification with a saturated fatty acid (lauric or myristic acids may be used) or by etherification with a saturated alcohol (lauryl alcohol is illustrative). In preferred practice and to maximize the oxidative cure capacity, at least about 0.5 mole of nonterminal nonconjugated unsaturated fatty acid per mole of polyepoxide is employed.

Fatty acids containing nonterminal nonconjugated ethylenic unsaturation are well known and will be illustrated herein by tall oil fatty acids. Other useful acids are oleic acid, linoleic acid, linolenic acid, and erucic acid.

Typical proportions are illustrated by the use of a diepoxide reacted with one molar proportion of conjugated fatty acid and one molar proportion of nonterminal nonconjugated unsaturated fatty acid, with not more than a 20% molar excess of either type of fatty acid over the other. A small (5%) excess of fatty acid is helpful to consume all the epoxy groups, and some residual fatty acid is not harmful.

The reaction of the polyepoxide with the fatty acid is a conventional adduction reaction which takes place easily at moderate temperature (50°-200° C.), the reaction being assisted by the presence of a small amount of basic catalyst.

The Diels Alder reaction is entirely conventional and will not be discussed in detail.

The nonreactive monomers are best illustrated by styrene, vinyl toluene and mixtures thereof and these provide the best properties. Interestingly, the dicarboxylic acids are poorly soluble in these monomers, so incorporation by Diels Alder reaction prior to copolymerization is important. Less desirably, one can use other nonreactive monoethylenic polymerizable monomers such as methyl methacrylate, acrylonitrile, vinyl acetate, ethyl acrylate, butyl acrylate, or the like, alone or in an admixture with one another.

The term "nonreactive" is commonly used to describe polymerizable monomers which contain no group other than ethylenic unsaturation which is capable of reacting either during the copolymerization or under any normally contemplated baking condition.

It is desired to stress that the copolymer should be substantially epoxy-free because unreacted epoxy groups in aqueous alkaline medium create a problem of storage instability, and such systems are not practical in commerce.

The solution copolymerization is itself entirely conventional, the reaction taking place in the solvent medium using heat and a free radical polymerization catalyst. The solution polymerication does not consume all of the unsaturation, and it is preferred to have a residual iodine value in the copolymer of at least about 40.

The solvents used should be minimized and selected for miscibility with water in the amounts used. Ether alcohols, such as 2-butoxy ethanol, exhibit good water miscibility, and ketones, such as methyl ethyl ketone, are also quite good. However, solvents with limited miscibility in water are also helpful, such as small amounts of butanol. The class of organic solvents which may be present when acidic resins are dispersed in water with the aid of a base is well known, and is not a feature of this invention, but alcoholic solvents are preferred.

The base used to neutralize the copolymer acidity is subject to wide variation. Volatile nitrogenous bases are preferred, these being well known for the purposes of solubilizing acidic resins to provide aqueous coatings. Amines or ammonia are particularly useful, ammonia being best since it is innocuous in sanitary can coating systems. This invention will be illustrated using ammonia, but selection of the base is of secondary significance.

Neutralization of the copolymer acidity may be partial or complete as needed for dispersion in water. Complete (100%) neutralization is preferred herein, but normally 50-100% neutralization is adequate.

The initial solvent solution of neutralized resin is thinned with water until the water predominates. The final resin solids content can range from about 20% up, depending upon the coating thickness which is desired and the viscosity which can be tolerated for application. Flow coating constitutes a preferred application technique in this invention, but the invention is not so limited. Typical coatings are applied at 30-60% resin solids, and these can be pigmented or not as desired.

The aminoplast and phenoplast resins which are useful herein may be of any character so long as they can be dissolved or stably dispersed in water containing the dissolved acidic copolymer. These resins provide methylol groups which are particularly reactive with the primary hydroxy groups and are used in an amount of from 5%-40%, preferably from 10%-35%, based on the total weight of resin. Typical aminoplast resins, all of which are formaldehyde condensates, are urea-formaldehyde, hexamethoxy methyl melamine and water dispersible transethers thereof with ethanol or other lower alcohol, benzoguanamineformaldehyde and the like, including acidic derivatives where the carboxyl groups assist solubilization in aqueous alkaline medium. Water soluble or dispersible phenolic resins (phenoplasts) are also useful, these being illustrated by the well known nongelled alkaline condensates of phenol with excess formaldehyde known as "A" stage resols. Any of these formaldehyde condensates can be used alone or in any desired mixture thereof. The phenolic resins provide the most outstanding corrosion and detergent resistance, but they introduce color problems which limit utility to primers which will be overcoated with opaque topcoats. The phenolic resins also require higher baking temperature than the aminoplast resins, but this invention still serves to reduce the temperature which is needed.

It is also possible to partially prereact the aminoplast or phenoplast resin with the carboxyl-functional copolymer in which case water dispersibility can be provided through the remaining unreacted carboxyl groups. In this way, the resin which is used need not be directly dispersible in water. Indeed, oil-soluble non-heat-hardening phenolics can be used in this fashion, namely, by prereacting them with a portion of the carboxyl functionality in the copolymer.

The invention is illustrated in the following example. All parts herein are by weight unless otherwise stated.

EXAMPLE 1

Example 1

| Charge Compositions (Grams) | |
|---|---|
| 1312 | Diglycidyl ether of bisphenol A having an epoxide equivalent weight of 900 |
| 496 | Conjugated 9-11 castor fatty acids |
| 496 | Tall oil fatty acids |
| 90 | Xylol |
| | Set Dean-Stark trap with xylol. Heat to 225° C. |
| | Hold for an acid value of 14-15. Cool and then add: |
| 800 | Butanol |
| 128 | Fumaric acid. |
| | Add the above at 125° C. and hold at 125° C. for 1 hour. |
| 624 | Styrene |
| 72 | Cumene hydroperoxide |
| | Premix the above and add to the reactor over a 3 hour period at 125° C. Hold for 1 hour at 125° C. |
| 16 | Cumene hydroperoxide- add and hold for 1 hour. |
| 16 | Cumene hydroperoxide- add and hold for 2 hours. |
| | Cool to 50° C. then add under agitation: |
| 1190 | Hexamethoxy methyl melamine (Note 1) |
| 410 | Ammonium hydroxide (28%) - add over a 15 minute period. |
| 4920 | Deionized water - add slowly over a 30 minute period, under agitation. Cool and strain. |

Note 1 - American Cyanamid product "Cymel 303" may be used.

The copolymer product has an acid value of 28.5, and the final aqueous coating composition is a milky dispersion having a solids content of 39.4%.

The invention is defined in the claims which follow.
We claim:

1. A copolymer dispersible in water with the aid of a volatile base comprising a solution copolymer of a resinous polyepoxide esterified to be epoxy-free with from about 0.3 to about 1.5 moles of at least one monocarboxylic acid containing conjugated ethylenic unsaturation per mol of polyepoxide, said esterified polyepoxide being Diels Alder adducted with from 3% to 10%, based on the weight of the copolymer, of an ethylenically unsaturated dicarboxylic acid, and said adduct being copolymerized with from 10% to 50%, based on the weight of the copolymer, of monoethylenically unsaturated nonreactive monomer containing a terminal ethylenic group.

2. A copolymer as recited in claim 1 in which said polyepoxide is also esterified with at least about 0.5 mole of ethylenically unsaturated monocarboxylic acid containing nonterminal nonconjugated ethylenic unsaturation per mol of polyepoxide.

3. A copolymer as recited in claim 1 in which said dicarboxylic acid is selected from fumaric acid and maleic acid.

4. A copolymer as recited in claim 3 in which said nonreactive monomer is selected from styrene, vinyl toluene, and mixtures thereof.

5. A copolymer as recited in claim 3 in which said copolymer is substantially fully neutralized with ammonia.

6. A copolymer as recited in claim 1 in which said copolymer is in solution in an alcoholic solvent.

7. A copolymer as recited in claim 1 in which said monocarboxylic acid contains from 8-22 carbon atoms.

8. A copolymer as recited in claim 1 in which said monocarboxylic acid contains from 10-18 carbon atoms.

9. A copolymer as recited in claim 1 in which said polyepoxide is a bisphenol-based diepoxide having an average molecular weight of from about 350 to about 4000 and an epoxy functionality in the range of 1.4-2.0.

10. A copolymer as recited in claim 1 in which said polyepoxide is a diglycidyl ether of bisphenol A having an average molecular weight of about 800 to about 3000 and an epoxy functionality in the range of 1.8 to 2.0.

11. A copolymer as recited in claim 1 in which said epoxy ester contains from about 0.5 to about 1.2 moles of said conjugated acid per mole of polyepoxide.

12. A copolymer as recited in claim 1 in which said copolymer has an iodine value of at least about 40 and from about 0.3 to about 2% of a drier is present, based on the weight of the copolymer, to speed the oxidative cure of said copolymer.

13. A water solution comprising the copolymer of claim 1 dispersed in water with the aid of a volatile base and water miscible organic solvent.

14. A water solution as recited in claim 13 further containing water dispersible aminoplast resin or phenoplast resin.

15. A water solution as recited in claim 14 in which the proportion of aminoplast resin is from 5%-40%, based on total resin.

* * * * *